United States Patent [19]
Snyder

[11] Patent Number: 5,588,038
[45] Date of Patent: *Dec. 24, 1996

[54] SYSTEM AND METHOD FOR SIGNALING A DEVICE AT A REMOTE LOCATION OVER A WIRELESS NETWORK

[75] Inventor: Bernard M. Snyder, San Diego, Calif.

[73] Assignee: J.F.A. Tech., Inc., San Diego, Calif.

[*] Notice: The term of this patent shall not extend beyond the expiration date of Pat. No. 5,490,200.

[21] Appl. No.: 349,548

[22] Filed: Dec. 5, 1994

Related U.S. Application Data

[63] Continuation-in-part of Ser. No. 154,818, Nov. 19, 1993, abandoned.

[51] Int. Cl.$^6$ ................................................ H04Q 7/12
[52] U.S. Cl. ........................ 379/57; 340/993; 379/58
[58] Field of Search ........................... 379/58, 59, 57, 379/63, 60, 44; 340/426, 539, 993, 825.44, 825.49; 455/33.1, 54.1, 12.1; 290/38 C

[56] References Cited

U.S. PATENT DOCUMENTS

| | | |
|---|---|---|
| 3,112,004 | 11/1963 | Neaville . |
| 3,824,469 | 7/1974 | Ristenbatt . |
| 4,619,231 | 10/1986 | Stolar et al. . |
| 4,660,528 | 4/1987 | Buck . |
| 4,884,055 | 11/1989 | Memmola . |
| 4,904,983 | 2/1990 | Mitchell . |
| 4,962,522 | 10/1990 | Marian ........................... 379/57 |
| 4,990,890 | 2/1991 | Newby . |
| 5,040,204 | 8/1991 | Sasaki et al. ..................... 379/58 |
| 5,081,667 | 1/1992 | Drori et al. ...................... 379/59 |
| 5,113,427 | 5/1992 | Ryoichi et al. . |
| 5,124,565 | 6/1992 | Yoshida et al. . |
| 5,140,308 | 8/1992 | Tanaka . |
| 5,303,286 | 4/1994 | Wideman ...................... 455/12.1 |
| 5,392,451 | 2/1995 | Schwendeman et al. ........ 455/13.1 |

OTHER PUBLICATIONS

"Automotive: Security Systems–Stop Thief!," Popular Science, Jun. 1993, p. 34.
"New: See How Electronics Will Change our Lives," The San Diego Union Tribune, Jan. 10, 1994, p. E–3 (the Posse by Audiovox).
"New Devices Will Alarm Car Thieves," *The San Diego Union–Tribune*, Feb. 9, 1995.
Chien, Philip "Letter to a Beeper," *Popular Mechanics*, Apr. 1994, at p. 50.

Primary Examiner—Curtis Kuntz
Assistant Examiner—Michael B. Chernoff
Attorney, Agent, or Firm—Fish & Richardson P.C.

[57] ABSTRACT

A system and method for communicating with a remote location, such as a vehicle or building, the system including a calling transceiver, a central transceiver, and a satellite. In the system and method, the calling transceiver and the central transceiver (or central switching facility) are used to transmit a forward wireless communication over-the-air, through the satellite, and to a pager transceiver located in the remote location in order to control a device located in the remote location. Upon receiving the signal, the pager transceiver generates a first signal, which is received by a tripping circuit, which in turn generates a second signal. The second signal causes a switch to trip, which thereby controls the device located at the remote location. The pager transceiver also has the capacity to transmit reverse wireless communications through the satellite, which allows monitoring of the device.

21 Claims, 3 Drawing Sheets

SYSTEM AND METHOD FOR SIGNALING A DEVICE AT A REMOTE LOCATION OVER A WIRELESS NETWORK

CROSS REFERENCES TO RELATED APPLICATIONS

The present application is a continuation-in-part application of U.S. patent application Ser. No. 08/154,818, entitled "System and Method for Remotely Tripping a Switch," filed on Nov. 19, 1993, now abandoned by the same inventors named on the present application.

BACKGROUND OF THE INVENTION

1. Field of the Invention

The present invention relates to a system and method for signaling a remote location. More particularly, the invention relates to a system and method for sending a signal to a remote location, such as a vehicle or building, over a wireless network in order to control a device located at the remote location.

2. Description of Related Art

Car-jackings and vehicle theft have become a serious problem, especially in the past few years. Many vehicle theft prevention systems for automobiles, trucks, and boats are known and presently used. These systems fall into three general classes: physical locking devices, alarm systems, and systems for disabling the vehicle. Nevertheless, vehicle thieves and car-jackers have conducted a running, and mainly winning, battle with such theft prevention systems.

Physical locking devices constitute the first class of vehicle theft prevention systems. An example of such a device is The Club®, which includes a metallic shaft and a locking mechanism located on the shaft. The Club® attaches to the steering wheel of a car or truck and, while attached, inhibits movement of the steering wheel. Thieves, however, can easily defeat The Club® and other physical locking devices, for example, by simply spraying freon into the locking mechanism and striking the lock with sufficient force to break it. The physical locking device can then be easily removed from the steering wheel.

Falling within the second class, myriad alarm systems exist for preventing vehicle theft. Such systems operate to deter a thief before the thief undertakes to steal a vehicle. Alarm systems employ various deterrence methods, including sound and visual alarms. Nevertheless, thieves can easily disable alarm systems, thereby rendering them ineffective, even useless in some cases. Even if not disabled, a thief can allow the alarm to activate and simply drive away in the vehicle while the alarm is sounding. Thus, alarm systems cannot counteract a determined thief.

As to the third type, various systems exist for disabling a vehicle. For example, some systems work in conjunction with law-enforcement agencies, by which an agency can remotely disable the vehicle. Such systems, therefore, require intervention by the agency and thus cannot be implemented by the vehicle owner without some assistance. In a similar system, the vehicle owner must call a central service, which can then transmit a signal over a satellite network to the vehicle. This system, however, only provides the capability to track the vehicle, but not to a shut it down. requires the central service and thus can be costly and can incur delays between the owner's initial call and the transmission of a cut-off signal to the vehicle by the service. In addition, the law-enforcement and central service systems require the vehicle owner to invest in expensive electronic components for installation in the vehicle and only work in a covered "local" area.

Other vehicle disabling systems use infra-red carrier waves produced by a transmitter that must be directed towards a receiver in the stolen vehicle to terminate the vehicle's operation. Such systems, however, require a short distance and a direct line of sight between the transmitter and receiver. Similar systems employ radio transmission devices to disable the vehicle. These systems also suffer from a limited range, and have the disadvantage of disabling all vehicles equipped with a similar radio receiver. Moreover, the infra-red and radio systems are expensive and demand that the vehicle owner invest in costly, customized devices for the vehicle.

Still other vehicle disabling systems use cellular telephone systems to disable the vehicle. In these systems, a cellular telephone, installed in the vehicle, receives signals sent over a cellular network by a caller. Such systems, however, have several drawbacks. First, they require an expensive, complicated cellular telephone in the vehicle that operates in full-duplex and receives voice signals. Second, because cellular systems receive and transmit relatively high power signals, the cellular telephone requires an antenna that is mounted on the exterior of the vehicle, making the antenna vulnerable to vandalism and thieves, who can disable the system by removing or damaging the antenna. Without an operational antenna, the cellular-based vehicle disabling system is rendered non-operational.

Finally, these systems, being cellular, have a limited geographic range of operation. The vehicle owner must subscribe to a cellular provider, which has only a limited geographic region in which it can provide service to its subscribers. Generally this is limited to a city, unless the provider interfaces with other cellular providers in other regions. The net effect is that, when a vehicle equipped with the cellular disabling system travels beyond the range of its cellular provider, the system is rendered useless. This is not the case, however, with satellite-based communication systems, such as pager systems.

Conventional vehicle disabling systems also lack the capacity to transmit signals back from the vehicle to the individual or entity that triggered the system. Such signals can be used to indicate the status of the vehicle, such as whether it has been disabled and where it is located. The benefit of transmissions back from the system is clear, providing the vehicle owner with important information for personal use and that can be relayed to law enforcement agencies.

Even beyond the application of disabling or signaling a vehicle, it is highly beneficial to be able to remotely control various devices and systems located in buildings or structures. The ability to remotely control various devices and systems has a wide variety of applications. For example, wireless systems can be used to control air-conditioning, alarm, and lighting devices and systems. At present, however, no remotely operated system is available that combines low cost and simplicity with unlimited range of operation. Moreover, no system is available that permits communications, such as status reports, back from the remotely located devices and systems.

In light of the foregoing, a need exists for a system and method for communicating with a vehicle or other remote location using a wireless network and an inexpensive transceiver located within the remote location having a virtually unlimited range of operation.

SUMMARY OF THE INVENTION

Accordingly, the present invention is directed to a system and method for signaling a remote location over a wireless network to control a device or system located at the remote location and for receiving signals back from that location that substantially obviates one or more of the problems due to limitations and disadvantages of the related art.

Additional features and advantages of the invention will be set forth in the description that follows, and in part will be apparent from the description, or may be learned by practice of the invention. The objectives and other advantages of the invention will be realized and attained by the system and method particularly pointed out in the written description and claims, as well as the appended drawings.

To achieve these and other advantages and in accordance with the purpose of the invention, as embodied and broadly described herein, the invention is a system for signaling a remote location via a wireless network, including a transmitter and a central transceiver. The system comprises a pager unit located in the vehicle for receiving a wireless communication initiated on the transmitter and for generating a first signal in response to receiving the wireless communication. The wireless communication is sent from the transmitter to the central transceiver, which receives the wireless communication and transmits the wireless communication to the pager unit. The system also includes a tripping circuit, which is responsive to the first signal, for generating a second signal, as well as a switch, responsive to the second signal, for controlling a device located at the remote location.

In another aspect, the present invention is a method for signaling a remote location. The method comprises initiating a wireless communication and transmitting the wireless communication by a transmitter, and receiving the wireless communication from the transmitter and transmitting the wireless communication by a central transceiver. The method further comprises receiving, by a pager unit, the wireless communication transmitted by the central transceiver and generating a first signal by the pager unit in response to receiving the wireless communication, the pager unit being located in the remote location. The method also comprises generating, in response to the first signal, a second signal by a tripping circuit, and controlling a device located at the remote location in response to the second signal.

In yet another aspect, the present invention is a system for monitoring and controlling a device in a remote location, the system including a transmitter and central transceiver. The system comprises a pager transceiver for receiving a first wireless communication, for generating a first signal in response to receiving the wireless communication, and for sending a second wireless communication to monitor the device, the pager transceiver being located in the remote location. The transmitter initiates the wireless communication and transmits the wireless communication to the central transceiver, which receives the wireless communication and transmits it to the pager transceiver. The central transceiver also receives the second wireless communication. The system further comprises a tripping circuit, responsive to the first signal, for generating a second signal, and a first switch, responsive to the second signal, for controlling the device.

In still another aspect, the present invention is a method for monitoring and controlling a device in a remote location. The method comprises initiating a first wireless communication and transmitting the first wireless communication by a transmitter; receiving the first wireless communication from the transmitter and transmitting the first wireless communication by a central transceiver; receiving by a pager transceiver the first wireless communication transmitted by the central transceiver, the pager transceiver being located in the remote location. The method further comprises generating a first signal by the pager transceiver in response to receiving the first wireless communication; generating, in response to the first signal, a second signal; and tripping a switch in response to the second signal in order to control the device. Finally, the method comprises transmitting, by the pager transceiver, a second wireless communication to the central transceiver to monitor the device.

In an exemplary embodiment of the above systems and methods, the central transceiver is a ground-based central pager switching station. The wireless communication is relayed over-the-air by a satellite from the pager switching station to the pager unit. In this system, moreover, the transmitter may be a telephone unit, on which the owner of the device to be controlled in the remote location makes a call, i.e., initiates the wireless communication. The call includes the number corresponding to the pager unit and a predetermined security code, the latter being used to prevent any inadvertent calls made to the pager unit from generating the first signal.

It is to be understood that both the foregoing general description and the following detailed description are exemplary and explanatory only and are not restrictive of the invention, as claimed.

BRIEF DESCRIPTION OF THE DRAWINGS

Understanding of the present invention will be facilitated by consideration of the following detailed description of a preferred embodiment of the present invention taken together with the accompanying drawings, in which like numerals refer to like parts and in which.

DETAILED DESCRIPTION OF THE INVENTION

In accordance with the present invention, a system and method are provided for communicating with a remote location, including a calling transceiver, a central transceiver, and a satellite. The system comprises a pager transceiver for receiving a wireless communication and for generating a first signal. The system also comprises a tripping circuit for generating a second signal in response to the first signal, as well as a switch, responsive to the second signal, for controlling a device located at the remote location. The pager transceiver also has the capacity to transmit wireless communications. Thus, the device can also be monitored. The remote location may be a vehicle or some type of structure. The wireless communications are relayed by the satellite from the central transceiver to the pager transceiver, and vice-versa. Communications from the central transceiver to the pager unit are sent over a forward communications link, and those from the pager unit to the central transceiver are sent over a reverse communications link.

For the remainder of this description, the term "vehicle owner" will be used, but it should be understood that this term is used for convenience and that "vehicle owner" as herein defined includes any person or entity having rightful possession, custody, or control of the vehicle (or system), including owners, operators, users, and custodians. The term "vehicle owner" should also be understood to apply to the owner or occupant of a structure or building, in which a system or device is located that can be remotely controlled using the system of the present invention.

Figure 1:
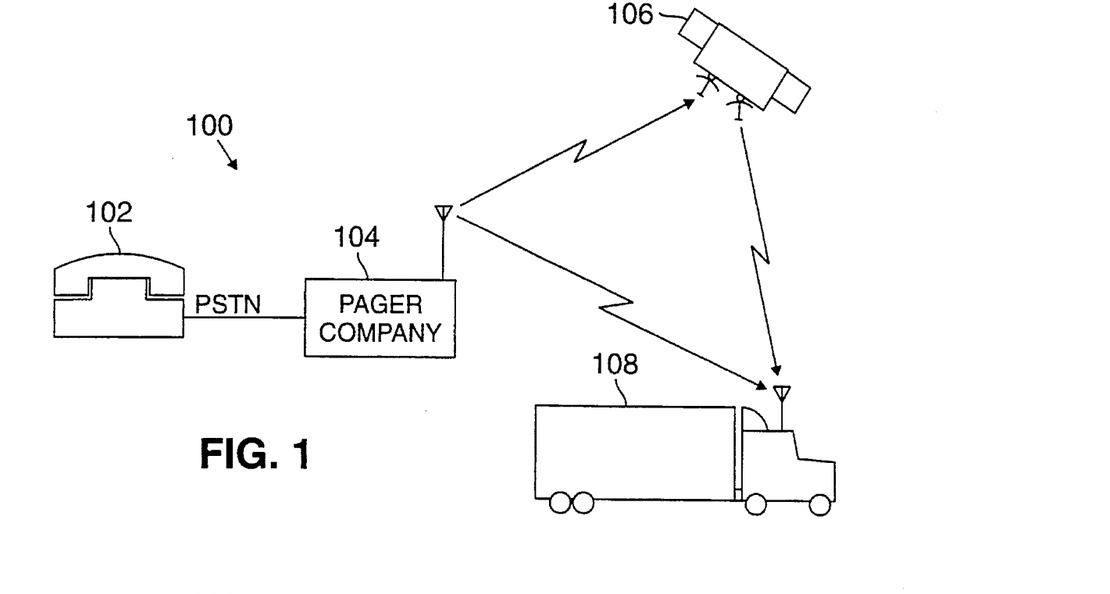
FIG. 1 is a diagrammatical illustration of an exemplary paging system for remotely tripping a switch in a vehicle in accordance with the present invention.

An exemplary embodiment of the system of the present invention is shown in FIG. 1 and is designated generally by reference numeral 100. As embodied and shown in FIG. 1, the system of the present invention includes a calling transceiver 102, a central switching ground-based transmission facility (e.g., a pager company) 104, a satellite 106, a vehicle 108, and a building 110. The calling transceiver 102 is coupled to the central switching facility 104 over a Public Switched Telephone Network (PSTN). The satellite 106 (or other wireless network, e.g., microwave or radio-wave) is used to relay signals from the central switching facility 104 to the vehicle 108 and/or building 110 and to relay signals travelling in the opposite direction. The details of this system are described below.

The calling transceiver 102 may be a conventional telephone and thus can be a pay-phone or private phone hard-wired to the PSTN. Alternatively, a cellular or other conventional wireless telephone remotely located from the PSTN can also be used in the system. Nevertheless, any other type of suitable transceiver that can send signals to a central transceiver can be used.

Figure 2:
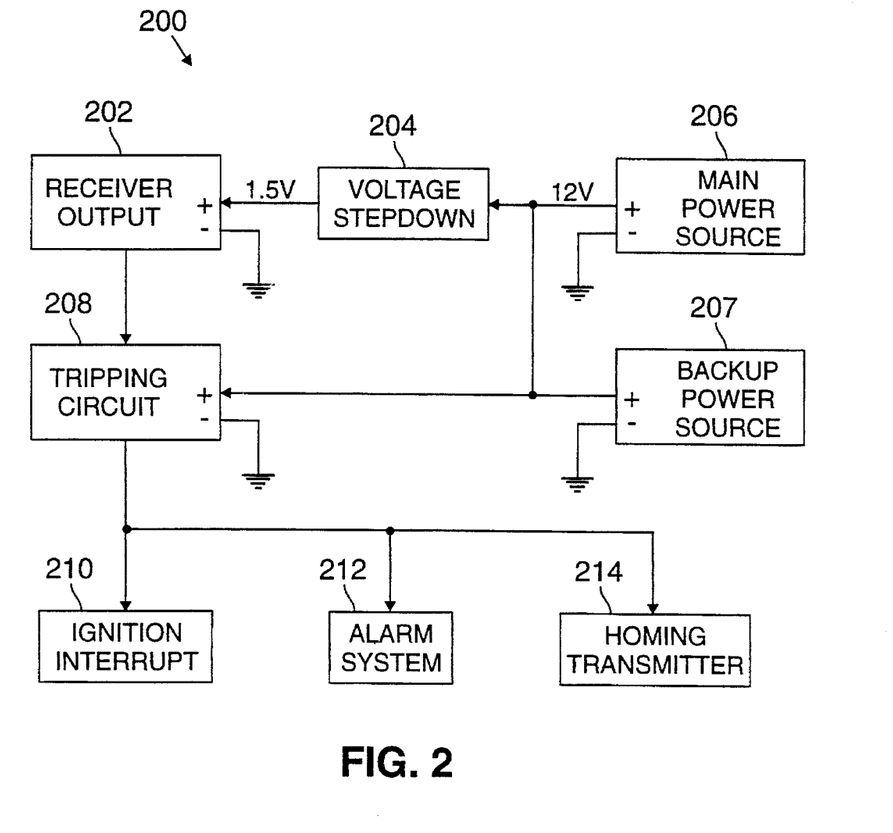
FIG. 2 is a block diagram of an exemplary receiver and tripping circuit located within a vehicle in accordance with the present invention.
Figure 5:
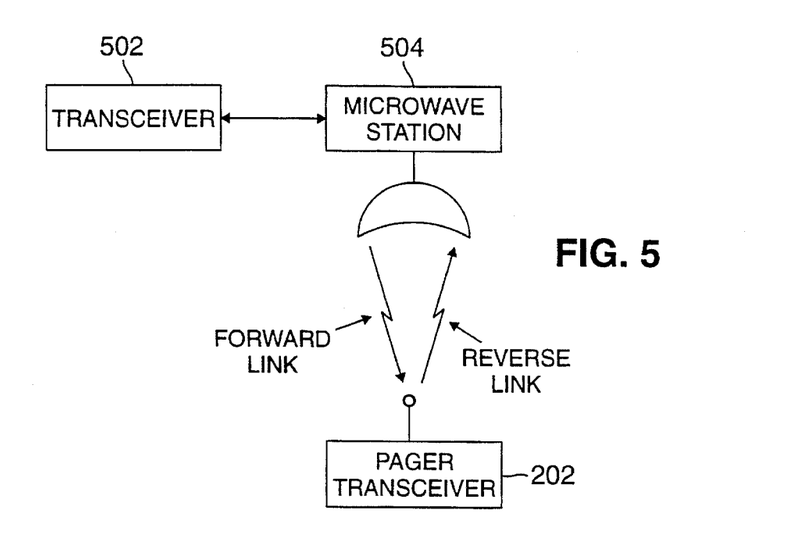
FIG. 5 is a diagrammatical representation of a system of the present invention in which signals are sent directly over-the-air from a central transceiver to a receiver located at the remote location.

The central switching facility 104 may be coupled to the PSTN. In this way, telephone calls can be made by individual callers over the PSTN (or to a Mobile Telephone Switching Office and then over the PSTN) directly to the central switching facility 104. As embodied herein and shown in FIG. 1, the central switching facility is a pager company or other similar signal transmitter through which a person operating the telephone 102 can send a signal to the satellite 106. The satellite is then used to relay the signal to a conventional pager-type transceiver located within the vehicle 108 and/or building 110. Such a pager transceiver is shown in FIG. 2 and is designated by reference numeral 202. As will be apparent to those skilled in the art, the system of the present invention can also be implemented in other conventional wireless networks, including microwave and radio-wave. Thus, as shown in FIG. 5, the system of the present invention may dispense with the satellite 106 and include only a transceiver (or transmitter) 502, a microwave or radio-wave relay station 504, and the pager transceiver 202.

Accordingly, the system of the present invention can be implemented without the satellite 106, the operator of the transceiver 502 instead sending the wireless communication through the relay station 504, which in turn sends the communication over-the-air on the forward link to the remote location or vehicle. In this way, the system would operate without the need for a satellite or similar device to relay the signal to the pager transceiver 202. Furthermore, the system may be used with a conventional transmitter that sends the wireless communication directly over-the-air to the pager transceiver 202, dispensing with the need for the relay station 504.

Referring now to FIG. 2, the vehicle 108, building 110, or other remote location includes circuitry 200 for controlling a switch in response to a signal sent by the vehicle or remote location owner. The circuitry 200 includes the transceiver 202 as well as a tripping circuit 208. As noted above and as embodied herein, the transceiver 202 is preferably a conventional pager unit capable of receiving signals transmitted over-the-air, either directly or through a relaying device, such as a satellite, as well as transmitting signals over the air. The pager transceiver 202 includes an antenna 203 for collecting wireless communications sent over the forward link and for radiating wireless communications transmitted over the reverse link. The pager transceiver 202 is assigned a unique telephone number by which the pager transceiver 202 can be accessed by a caller. The pager transceiver 202 can also be assigned a predetermined security code, for example, a four-digit number. In this way, the pager transceiver 202 will not generate a control signal inadvertently, i.e., without receiving the security code.

The pager transceiver 202 and the tripping circuit 208 are both powered by a DC power source 206 located within the vehicle 108. Conventional vehicle power sources, such as an automobile battery, are generally 12 Volts DC. The pager transceiver 202, however, is a low-voltage device, for example, a 1.5 Volt DC unit. Accordingly, a voltage step-down circuit 204 is used to convert the high voltage generated by the power source 206 to the low voltage for the pager transceiver 202. The tripping circuit 208, on the other hand, can be a 12 Volt DC circuit and thus directly coupled to the power source 206. The pager transceiver 202 can also be coupled to a backup power source 207. The backup power source 207 can be a rechargeable battery, such as a nicad battery, coupled to a device for recharging the battery, for example, an automobile or truck alternator.

The pager transceiver 202 is coupled to the tripping circuit 208. The tripping circuit, in turn, can be coupled to an alarm system 210, an ignition interrupt device 212, a homing transmitter 214, and/or other miscellaneous devices. The alarm system 210 is a conventional alarm system and may be capable of generating various alarm signals, including audible and visual signals.

The homing transmitter 214 is also a conventional device, designed to produce a signal, radio tone, or digital pulse by which the vehicle 108 can be located, for example, through triangulation. As will be apparent to those skilled in the art, the homing transmitter 214 can be implemented in various ways, one of which would be an SOS-type frequency transmitter, commonly used on boats and ships for indicating and locating a man-overboard by producing an "E-PIRB" signal. The homing transmitter 21 4 could alternatively be a Global Positioning System (GPS) type transmitter, designed to generate a digital location identification for determining the geographic position of the vehicle.

The ignition interrupt 212 is also a conventional device, commonly available from vehicle alarm system manufacturers.

Figure 3A:
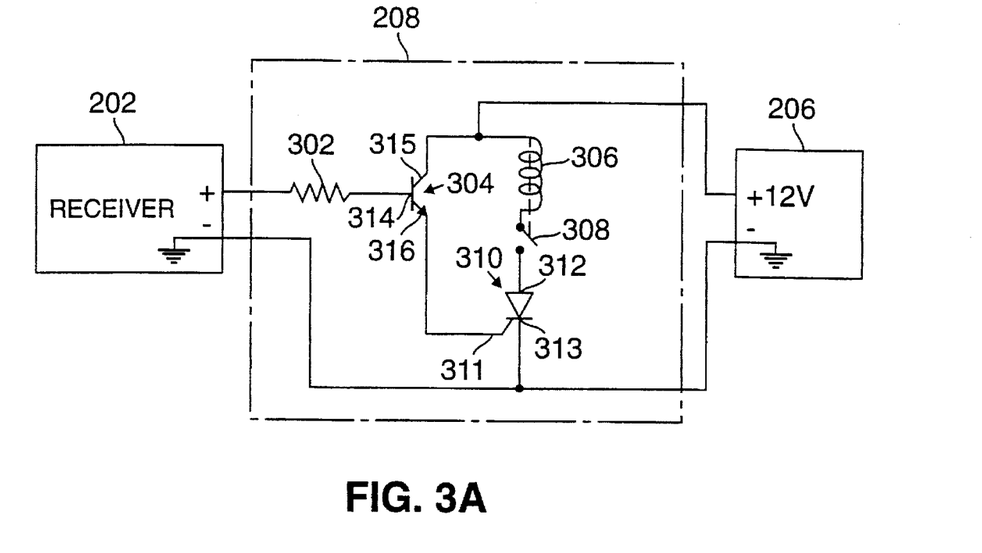
FIG. 3A is a circuit diagram illustrating an exemplary embodiment of the tripping circuit of FIG. 2.
Figure 3B:
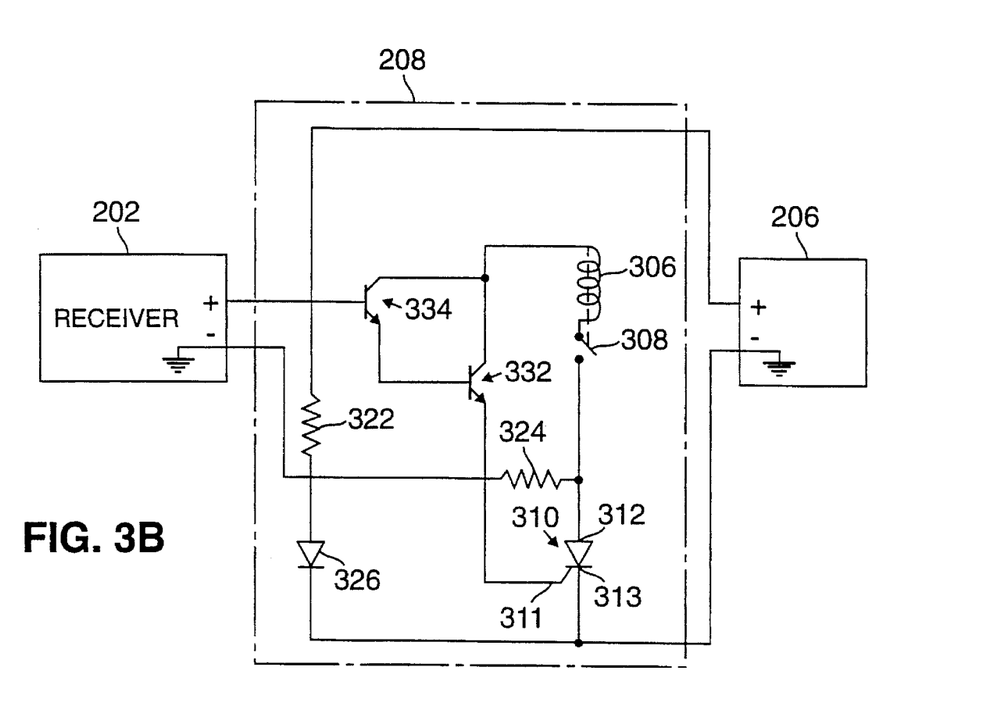
FIG. 3B is a circuit diagram illustrating an alternative exemplary embodiment of the tripping circuit of FIG. 2.

In response to a signal output from the pager transceiver 202, the tripping circuit 208 will operate to trip a switch. As noted above, however, the tripping circuit 208 operates at a high voltage, while the pager transceiver 202 outputs a low voltage signal. Accordingly, in order to trip the high voltage switch and hold the switch in its tripped state, a voltage/current conversion circuit is used. FIGS. 3A and 3B illustrate two examples of such a circuit. As will be apparent to those skilled in the art, other suitable tripping circuits can be used.

The tripping circuits illustrated in FIGS. 3A and 3B are designed such that a low-current, low-voltage input turn-on signal will trigger a normally open 12 Volt (or other voltage) relay (or switch) that will subsequently remain triggered after removal of the turn-on signal. The design objective is to provide this function with a minimum current from the turn-on signal, while providing high current (several amps) switching capability of the relay. Referring now to FIG. 3A, a first embodiment of the tripping circuit includes a limiting resister 302, a transistor 304, a relay 306, a switch 308, and a silicon controlled rectifier (SCR) 310. The input to the circuit 208 is the low-current, low-voltage output from the transceiver 202. The voltage from this input signal is, for example, 1.5 Volts D.C. The input signal from the transceiver 202 is applied to the base of the transistor 304 through the limiting resister 302, for example, a 3000 Ohm resistor, which is used to limit the current into the base of the transistor 304.

The transistor 304 is a conventional NPN transistor, configured as an emitter follower, with its collector at 12 Volts D.C. as supplied by the power source 206. The transistor 304 has a base 314, a collector 315, and an emitter 316. When a signal is applied to the base 31 4 of the transistor 304, the transistor operates as a current amplifier. The SCR 310 is a conventional silicon controlled rectifier, functioning as current controlled switch that can operate from a controlling current several orders of magnitude less than the controlled current. The SCR 310 has a gate 311, an anode 312, and a cathode 313.

The emitter 316 of the transistor 304 is connected to the gate 311 of the SCR 310. The current amplification function of the transistor 304 provides a boost to the input signal from the transceiver 202, allowing the input signal to turn-on the SCR 310 with a minimum of input current. The cathode 313 of the SCR 310 is connected to ground, and the anode 312 is connected to a coil of the relay 306 through the normally closed contacts of reset switch 308.

In the non-triggered condition, the relay coil 306, the reset switch 308, and the cathode 313 of the SCR 310 are all at 12 Volts potential, with no current flowing in the 12 Volt circuit. When current is pulled through the gate 311 of the SCR 310 by the transistor 304, the SCR turns-on, causing current to flow from its cathode 313 to its anode 31 2, through the normally closed reset switch 308, thereby triggering the relay coil 306.

The SCR 310 will remain turned-on as long as a minimum of 30 mA is applied through the SCR. As embodied herein, the resistance of the relay 06 is 160 ohms, which supplies 75 mA of current, a level sufficient to maintain the SCR 310 in the on state. When the reset switch 308 is opened from its normally closed state, the current flow through the SCR 10 is interrupted, and the SCR resets to the non-conductive off state.

The components constituting the circuit in FIG. 3A can be implemented, for example, with the following Radio Shack® parts: relay 306 (RS 275-2862), transistor 304 (RS-276-1617), and SCR 310 (RS 276-1067). The Radio Shack® relay specified above has a continuous coil voltage of 13.2 Volts D.C., a coil resistance of 130 Ohms, a pull-in voltage of 9 Volts D.C., a contacting rating of 5.0 Amps at 125 Volts D.C., and a nominal current of 75 mA. The Radio Shack® transistor has a voltage across the collector-emitter of 30 Volts, a collector current of 800 mA, and a power rating of 11.8 Watts. The Radio Shack® SCR has a D.C. gate current of 6 mA and on-state current of 6 Amps, a D.C. holding current of 30 mA, a peak reverse gate voltage of 10 Volts, and an average gate powered dissipation of 0.5 Watts.

Referring now to FIG. 3B, another embodiment of the low-current, low-power tripping circuit 208 is illustrated. This second circuit includes several of the same components comprising the first circuit shown in FIG. 3A, namely, the relay 306, the switch 308, and the SCR 310. In addition to these components, the second circuit includes a first resistor 322, a second resistor 324, a diode 326, a first transistor 332, and a second transistor 334. The circuit shown in FIG. 3B can be implemented using a 400 Ohm resistor for the first resistor 322, a 100 Ohm resistor for the second resistor 324, NPN transistors identical to the transistor 304, and a conventional diode.

In this tripping circuit, the input signal from the receiver 202 is applied to the base of the first transistor 332 and to the cathode 313 of the SCR 310 through the second resistor 324. The second resistor 324 provides a minimal current through the SCR 310 to assist the relay 306 in holding the SCR in the on state until the relay 306 builds up its full current.

The diode 326 is biased forward by the first resistor 322, producing a 0.6 Volt positive reference voltage. The input signal is applied between the base of the first transistor 332 and the reference voltage. Due to the biasing action of the diode 326, the 0.6 Volt input signal applied to the base of the first transistor 332 becomes 1.2 Volts. The first transistor 332 and the second transistor 334 form a power Darlington pair and act as one transistor with a beta gain of 400. The two transistor pair 332, 334 provides a current gain such that the low current input signal from the receiver 202 can turn-on the SCR 310.

When the SCR 310 is set to the on state, the relay 306 starts to build up a current through induction, but the pulse width of the input signal is not long enough to allow the relay to build sufficient current to hold the SCR on. The second resistor 324 provides minimal current through the SCR 31 0 to assist the relay 306 in holding-on the SCR until the relay builds up its full current. Breaking the relay contacts causes the current through the first resistor 322 to become insufficient to hold the SCR on, and the circuit will thus reset. The pulse width of the input signal must be of sufficient duration to allow the relay 306 to build current to a sufficient level to where the SCR 310 will remain turned-on.

Referring again to FIG. 1, operation of the system 100 will now be described, specifically with respect to a vehicle. It should be understood, however, that the system can be used not only for a vehicle, but for any remote location in which the circuitry 200 can be located and in which it is useful to remotely control a device or system.

When the owner of the vehicle 108 equipped with the circuit 200 has knowledge that the vehicle is being illegally and/or wrongfully operated (e.g., a car-jacking), the owner locates a transceiver (e.g., a telephone) 102 from which to make a call. On the telephone 102, the owner dials the assigned telephone number and security code of the transceiver (e.g., a paging unit) 202 located within the vehicle 108. This call is transmitted over the PSTN (if the owner is calling from a telephone wired to the PSTN) to the central switching ground-based transmission facility (or pager company) 104. The call is then transmitted through the pager company 104 to the satellite 106 or similar device, which relays the call over the forward link to the pager transceiver 202.

The call could alternatively be directly transmitted from the central switching facility 104 to the pager transceiver 202, bypassing relaying the call through the satellite 106 or similar device. Accordingly, as described previously, the call can be sent through a variety of wireless networks to reach the vehicle 108.

Once the pager transceiver 202 in the vehicle 108 receives the forward link call, it sends an input signal to the tripping circuit 208. The tripping circuit 208 then processes the input signal, amplifying it to a suitable current and causing the SCR 310 to turn-on. After the SCR 310 is turned-on, sufficient current will build up to trigger the relay coil 306. Triggering of the relay 306, in turn, activates the ignition interrupt 212, the alarm system 21 0, the homing transmitter 21 4, and/or other optional devices, depending on the systems with which the vehicle is equipped. Once activated, the ignition interrupt 212 shuts-down the vehicle, the alarm system 210 produces whatever audio and/or visual effects it may have, and the homing transmitter 214 emanates a signal by which the vehicle can be tracked or located.

Alternatively, the vehicle 108 may be equipped with a device that terminates the fuel supply to the vehicle's engine. This will cause the vehicle to more gradually shut-down than if the ignition interrupt circuit 214 is provided, preventing the thief from losing control of the vehicle before operation of the engine terminates. The vehicle may also be equipped with a conventional voice or sound circuit for warning the thief that the vehicle is about to shut-down, this circuit also being tripped in response to reception by the pager transceiver 202 of the owner's call. As will be apparent to those skilled in the art, various other devices and methods can be employed to disable the vehicle, and a variety of devices can be coupled to the tripping circuit and thereby activated upon tripping of the switch.

The tripping circuit 208 can be reset, for example, by a manual switch located in the vehicle 108. This switch can be hidden somewhere within the vehicle to prevent the unwanted vehicle operator from discovering it and thereby restarting the vehicle's engine. When the manual reset switch is activated by the vehicle owner, the normally closed switch—which opens when the tripping circuit 208 is tripped—will be closed, and the tripping circuit 208 will return to its non-tripped state.

Alternatively, the vehicle owner may remotely call the pager transceiver 202 in order to reset the tripping circuit 208. The pager transceiver 202 may have the capacity to recognize a reset code, for example, a four-digit number, similar to the security code. If so equipped, when the owner dials the pager transceiver's 202 assigned telephone number together with the reset code, the pager transceiver 202 will receive this signal and generate a reset signal that resets the tripping circuit.

The system of the present invention can be used by individual vehicle owners to thwart car-jackings. In such cases, the owner witnesses the theft, locates a telephone, and dials the telephone number and security code of the pager transceiver 202 to disable the vehicle. Attempting to operate the vehicle when it is disabled, the thief will be forced to abandon it. If the owner is able to quickly locate a telephone, say, in a matter of five minutes, and thereby disable the vehicle, the owner can then call the police and tell them the vehicle is no more than a five minute drive from the scene of the car-jacking.

In another application, the system can be used, for example, by rental car companies to prevent delinquent renters from further operation of the rented vehicle. In such cases, when the vehicle is not returned to the company on time, the company can dial the pager transceiver's 202 telephone number and security code and disable the vehicle, preventing unlawful and possibly harmful further use by the renter.

As is apparent from the preceding description, the inventive system and method can be used in many applications on a variety of vehicles and/or remote locations. Automobiles, trucks, boats, motorcycles, and buildings or other structures are examples of the types of vehicles and locations in which the present invention can be employed to prevent and/or stop unwanted and illegal use of the vehicle, or to activate some system in a remote location.

For example, if the pager transceiver 202 were located in a building, it could be interconnected through the tripping circuit 208 to a device or system located within or near the building, such as an air-conditioning, alarm, or heating system. Thus, when the pager transceiver 202 receives the forward link wireless communication from the transmitter 102, the pager unit 202 would generate a signal that controls operation of the system to which the pager transceiver 202 is connected.

The pager transceiver 202 can be implemented using various devices capable of receiving wireless transmissions. And the tripping circuit 208 can be implemented with various circuit components and circuitry, or with computer software embodied in a central or dedicated computer located in the vehicle or remote location.

Figure 4:
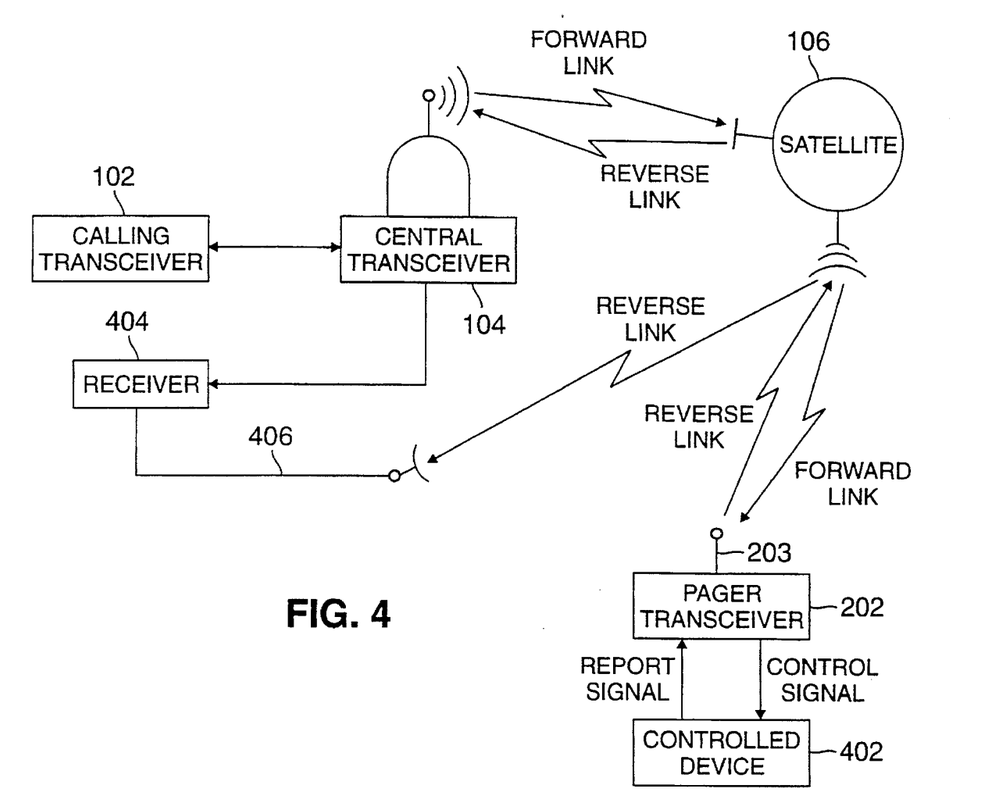
FIG. 4 is a diagrammatical representation of an exemplary two-way signaling system of the present invention for remotely controlling a device located in a remote location and for monitoring the device via signals sent back from the remote location.

Referring now to FIG. 4, the capability of the system of the present invention to transmit and receive wireless communications over the forward and reverse links will be described. Pager transceivers 202 are publicly available and well-known to those skilled in the art. For example, Orbcomm, located at 21700 Atlantic Boulevard, Dulles, Va. 20166, markets a pager transceiver that operates over a satellite network. The Orbcomm pager transceivers, such as the P2C2, can be used to send and receive a variety of messages—typically from 6 to 250 characters in length, i.e., a small paragraph. These pagers can also send alphanumeric data. (See Popular Mechanics, April 1994, at 50–54.)

Thus, the pager transceiver 202 can be used to send signals to the central transceiver 104, either through the satellite 106, if present in the system, or directly over-the-air to the central transceiver 104. The signals may be responsive to the forward wireless communication sent to the remote location by the calling transceiver 102 and may include status signals, indicating the status of the device 402 being controlled by the system. The signals transmitted by the pager transceiver 202 may be ultimately received by a receiver 404, such as a handheld unit possessed by the owner, or by the calling transceiver 102 that first contacts the pager transceiver 202. The receiver may comprise a standard hard-wired unit that receives signals from the central transceiver 104, or may comprise a satellite receiver (e.g., another pager unit) having an antenna 406 that can receive satellite transmissions. In this way, the owner can monitor operation of the device being controlled. Further, the pager transceiver 202 can be used to send signals that are responsive to sensing various conditions and that request an action by the owner.

In accordance with the present invention, therefore, the pager transceiver 202 can send wireless communications over the reverse link to serve a variety of functions. In one application, if the calling transceiver 102 sends a forward wireless communication to the pager transceiver 202 to shut-down the vehicle 108, the pager transceiver 202 can send a reverse link status signal back to the calling transceiver 102 indicating that the vehicle 108 has been shut-down. Because conventional pager transceivers, such as the Orbcomm P2C2, have GPS receivers built-in, they can be used to relay the position of the stolen vehicle after it has been shut-down so that it can be easily located. Thus, the pager transceiver 202 may be responsive to forward link wireless communications from the calling transceiver 202. The pager transceiver 202 can also send status reports over the reverse link to the calling transceiver 102 or the receiver 404 indicating status, etc., so that the device 402 at the remote location or the vehicle 108 can be monitored for a variety of conditions.

Accordingly, the pager transceiver 202 can be responsive to forward link signals or can be used to send unprompted reverse link signals for periodic monitoring purposes. In this way, an inexpensive system can be used to communicate back and forth between a monitoring station and a remote location, such as a vehicle or building containing various controllable devices.

It will be apparent to those skilled in the art that various modifications and variations can be made in the system and method of the present invention without departing from the spirit or scope of the invention. Thus, it is intended that the present invention covers the modifications and variations of this invention, provided they come within the scope of the appended claims and their equivalents.

What is claimed is:

1. A system for remotely stopping a vehicle theft, comprising:

a transmitter for generating a calling code and a predetermined security code;

a central switching unit for receiving said calling code and said predetermined security code and for generating a forward wireless communication including said calling code and said predetermined security code;

a satellite for receiving and transmitting said forward wireless communication;

a pager transceiver, located in a vehicle, for receiving said wireless communication and for transmitting a reverse wireless communication, wherein said pager unit is responsive to said calling code and generates a first signal in response to receiving said predetermined security code;

a tripping circuit, responsive to said first signal and located in said vehicle, for generating a second signal; and a switch, responsive to said second signal and located in said vehicle, for disabling said vehicle;

wherein said pager transceiver is a digital transceiver that receives and sends only low-power short digital data packets and that cannot receive digital and analog voice transmissions;

wherein said reverse wireless communication can be relayed through said satellite to said central switching unit.

2. The system recited in claim 1 wherein the transmitter comprises a telephone for dialing code, said code generating the forced wireless communication, said code including a remote location pager number corresponding to the pager transceiver and a predetermined security code.

3. The system recited in claim 1 wherein the switch includes an ignition interrupt device for stopping operation of an engine in the vehicle.

4. The System recited in claim 1, further comprising an alarm system, said alarm system being responsive to the tripping circuit.

5. The system recited in claim 1, further comprising a homing circuit, responsive to the tripping circuit, for generating a homing signal.

6. The system recited in claim 1 wherein said vehicle has a fuel supply, and wherein the action caused by the switch impedes said fuel supply.

7. The system recited in claim 1 wherein the reverse wireless communication includes a status signal reporting a condition in the vehicle.

8. The system recited in claim 1 wherein the reverse wireless communication is responsive to the forward wireless communication.

9. A method for remotely stopping a vehicle theft, comprising:

first transmitting a forward signal by a transmitter, said signal including a calling code and a predetermined security code;

first receiving said forward signal by a central switching unit;

second transmitting said forward signal by said central switching unit;

satellite relaying said forward signal to a pager transceiver located in a vehicle;

second receiving said forward signal by said pager transceiver if said calling code corresponds to said pager transceiver;

generating a tripping pulse by said pager transceiver in response 1o response said predetermined security code, said tripping pulse having a low voltage;

converting said tripping pulse from said low voltage to a higher voltage by a tripping circuit, said tripping circuit being located in the vehicle and consisting of a voltage step-up circuit for increasing the voltage of said first signal from said low voltage to said higher voltage;

tripping a switch located in said vehicle in response to conversion of said tripping pulse from said low voltage to said higher voltage, thereby disabling said vehicle; and third transmitting a reverse signal by said pager transceiver, wherein said reverse signal can be satellite relayed to said central switching unit;

wherein said pager transceiver is a digital transceiver that receives and sends only low-power short digital data packets and that cannot receive digital and analog voice transmissions.

10. The method recited in claim 9 wherein the reverse signal includes a status signal reporting a condition in the vehicle.

11. The method recited in claim 9 wherein the reverse signal is responsive to the forward signal.

12. The method recited in claim 9 wherein said vehicle has a vehicle ignition, the method further comprising interrupting said vehicle ignition in response to the tripping step.

13. The method recited in claim 9, further comprising activating an alarm system in response to the tripping step.

14. The method recited in claim 9, further comprising generating a homing signal in response to the tripping step.

15. A system for remotely stopping a vehicle theft, consisting essentially of:

a pager transceiver, located in a vehicle, for receiving a forward wireless communication, for generating a first signal in response to receiving said forward wireless communication, and for transmitting a reverse wireless communication, said forward wireless communication begin transmitted by a transmitter to a central switching unit, said switching unit transmitting said forward wireless communication to a satellite, said satellite relaying said forward wireless communication transmitted from said central switching unit to said pager transceiver, said forward wireless communication and reverse wireless communication consisting of a digital data packet, and said forward wireless communication including a calling code corresponding to said pager transceiver and a predetermined security code, said first signal being generated by said pager transceiver in response to receiving said predetermined security code, wherein said reverse wireless communication can be relayed through said satellite to said central switching unit;

a tripping circuit, responsive to said first signal and located in said vehicle, for generating a second signal; and a switch, responsive to said second signal, for disabling said vehicle;

wherein the absence of said predetermined security code in said forward wireless communication prevents said pager transceiver from generating said first signal; and wherein said pager transceiver is a digital transceiver that receives and sends only low-power short digital data packets and that cannot receive digital and analog voice transmissions.

16. The system recited in claim 15 wherein the reverse wireless communication includes a status signal reporting a condition in the vehicle.

17. The system recited in claim 15 wherein the reverse wireless communication is responsive to the forward wireless communication.

18. A system for remotely stopping a vehicle theft, comprising:

a transmitter for generating a calling code and a predetermined security code;

a central switching unit for receiving said calling code and said predetermined security code and for generating a forward wireless communication including said calling code and said predetermined security code;

a satellite for receiving and transmitting said forward wireless communication;

a pager transceiver, located in a vehicle, for receiving said forward wireless communication and for transmitting a reverse wireless communication, said pager transceiver being responsive to said calling code and generating a pager signal in response to receiving said predetermined security code, said pager signal having a low voltage;

a tripping circuit, responsive to said pager sisal and located in said vehicle, for generating a tripping signal, said tripping signal having a higher voltage than said pager signal, said tripping circuit including a voltage step-up circuit for converting the voltage of said pager signal from said low voltage to said higher voltage; and an actuator, responsive to said tripping signal, for disabling said vehicle;

wherein said pager transceiver is a digital transceiver that receives and sends only low-power short digital data packets and that cannot receive digital and analog voice transmissions;

wherein the absence of said predetermined security code in said forward wireless communication prevents said pager transceiver from generating said first signal; and wherein said reverse wireless communication can be relayed through said satellite to said central switching unit.

19. A system for remotely signaling a door locking system in a vehicle, said door locking system being located in said vehicle, comprising:

a transmitter for generating a calling code and a predetermined security code;

a central switching unit for receiving said calling code and said predetermined security code and for generating a forward wireless communication including said calling code and said predetermined security code;

a satellite for receiving and transmitting said forward wireless communication;

a pager transceiver, located in said vehicle, for receiving said forward wireless communication and for transmitting a reverse wireless communication, said pager transceiver being responsive to said calling code and generating a pager signal in response to receiving said predetermined security code;

a tripping circuit, responsive to said pager signal and located in said vehicle, for generating a tripping signal; and an actuator, responsive to said tripping signal and located in said vehicle, for locking and unlocking said door locking system in said vehicle;

wherein said pager transceiver is a digital transceiver that receives and sends only low-power digital data packets and that cannot receive digital and analog voice transmission;

wherein the absence of said predetermined security code in said forward wireless communication prevents said pager transceiver from generating said first signal; and wherein said reverse wireless communication can be relayed through said satellite to said central switching unit.

20. The system recited in claim 19 wherein the reverse wireless communication includes a status signal reporting a condition in the vehicle.

21. The system recited in claim 19 wherein the reverse wireless communication is responsive to the forward wireless communication.

* * * * *